(12) United States Patent
Mazur (10) Patent No.: US 8,776,325 B2
(45) Date of Patent: Jul. 15, 2014

(54) TRIM FASTENING SYSTEM

(75) Inventor: Lorin A. Mazur, Shelby, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 182 days.

(21) Appl. No.: 13/293,412

(22) Filed: Nov. 10, 2011

(65) Prior Publication Data

US 2013/0117969 A1     May 16, 2013

(51) Int. Cl.
*A44B 99/00* (2010.01)
*F16B 17/00* (2006.01)
*F16B 5/12* (2006.01)

(52) U.S. Cl.
USPC ............................................ 24/297; 411/508

(58) Field of Classification Search
None
See application file for complete search history.

(56) References Cited

U.S. PATENT DOCUMENTS

| | | | |
|---|---|---|---|
| 7,698,787 B2* | 4/2010 | Scroggie et al. | 24/297 |
| 2006/0207068 A1* | 9/2006 | Lepper | 24/297 |
| 2009/0188086 A1* | 7/2009 | Okada | 24/297 |

* cited by examiner

*Primary Examiner* — Jack W. Lavinder
(74) *Attorney, Agent, or Firm* — Quinn Law Group, PLLC (57) ABSTRACT

A fastener is configured to attach to a hole of a primary panel and to mate to a doghouse. The fastener includes a core having a doghouse end and a piercing end; a datum feature; a neck extending from the datum feature toward the doghouse end; a foot feature on the doghouse end; a cone on the piercing end; and at least three snap features, which are symmetric about the core. The cone is configured to pierce any rain paper covering the holes. The doghouse is configured to join a trim component to the fastener. The doghouse includes a fastener end configured to support the fastener and a trim end configured to attach to the trim panel. The doghouse also includes a cradle formed on the fastener end, and configured to hold the fastener, and a collar configured to allow the fastener access to the cradle.

17 Claims, 6 Drawing Sheets

TRIM FASTENING SYSTEM

TECHNICAL FIELD

This disclosure relates to fastener systems for attaching trim panels to other panels or sheets.

BACKGROUND

Many vehicles use trim panels to cover metal or structural sheets on various portions of the interior, such as doors. The trim panels may be formed from different materials and may serve numerous cosmetic and functional purposes. The trim panels may be very complex in shape and may have additional components attached thereto.

SUMMARY

A fastener and a doghouse of a fastening system are provided. The fastening system is configured to engage a trim component to a primary panel having one or more holes.

The fastener is configured to attach to the at least one hole of the primary panel and to mate to the doghouse. The fastener includes a core having a doghouse end and a piercing end. The fastener also includes a datum feature, a neck extending from the datum feature toward the doghouse end, a foot feature on the doghouse end, and a cone on the piercing end. The cone is configured to pierce rain paper, which may be covering the holes. The fastener further includes at least three snap features, which are symmetric about the core.

The doghouse is configured to join the trim component to the fastener. The doghouse includes a fastener end configured to support the fastener and a trim end configured to attach to the trim panel. The doghouse also includes a cradle formed on the fastener end and configured to hold the fastener and a collar configured to allow the fastener access to the cradle.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
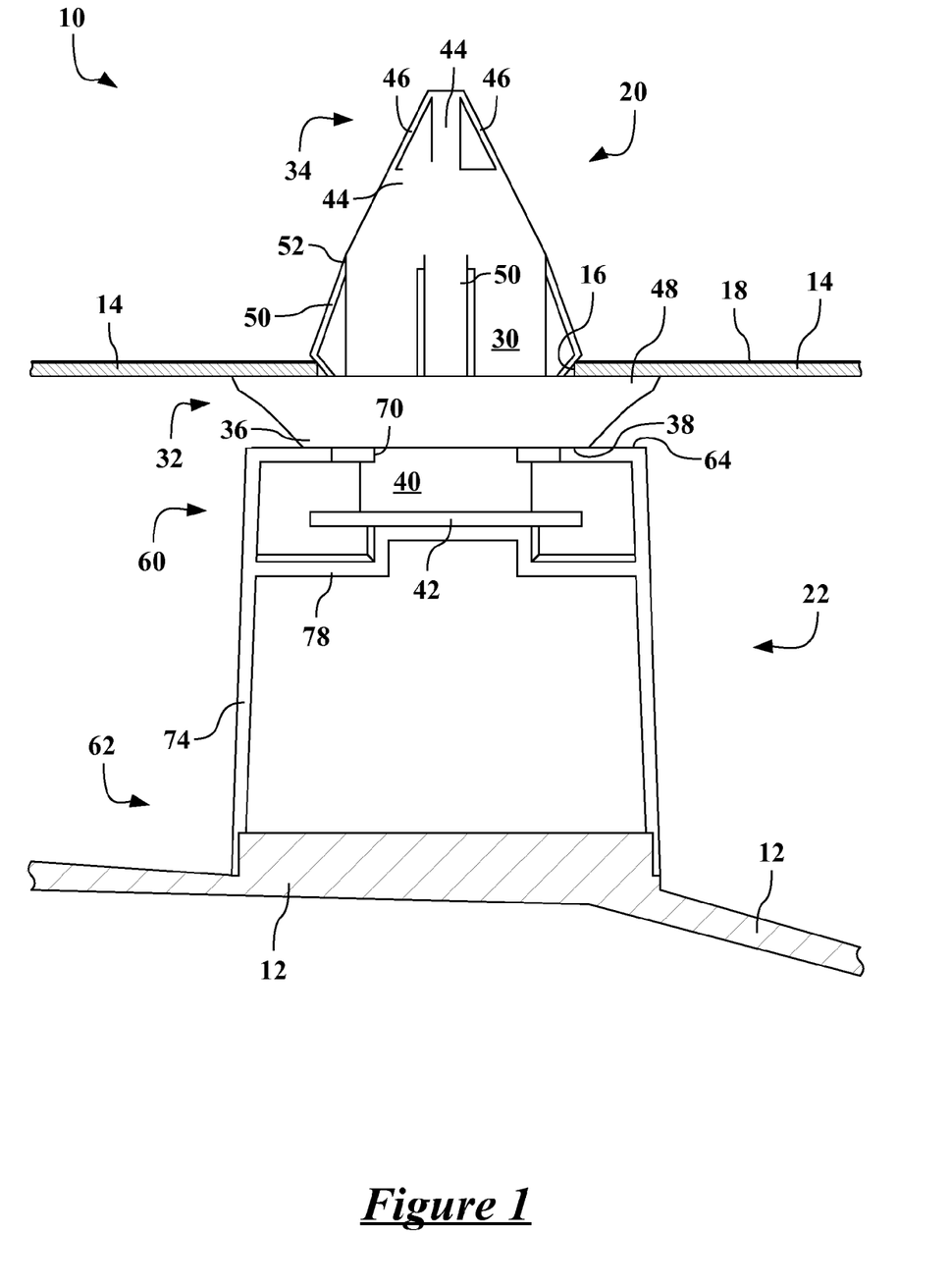
FIG. 1 is a schematic, cross-sectional view of a fastener system having a fastener and a doghouse.

Referring to the drawings, wherein like reference numbers correspond to like or similar components whenever possible throughout the several figures, there is shown in FIG. 1 a fastening system 10 that may be used within vehicles. The fastening system 10 is configured to engage a trim component 12 to a primary panel 14 through one or more holes 16. Features and components shown in other figures may be incorporated and used with those shown in FIG. 1, and components may be mixed and matched between any of the configurations, figures, or drawings shown.

The primary panel 14 may be a door panel, trunk panel, roof panel, or other component to which the trim component 12 may be attached. In some configurations, the primary panel 14 may be covered with a layer of rain paper 18, which may be placed between the primary panel 14 and the trim component 12 and may cover the holes 16. The rain paper 18 is a thin film, membrane, or covering that protects against passage of moisture beyond the primary panel 14 to the other, and may be located on either side of the primary panel 14.

The trim component 12 may be, for example and without limitation, an interior trim panel for a door. The primary panel 14 may be formed from metal and the trim component 12 may be formed from one or more types of plastic, but either component may be formed from any suitable material. The holes 16 may be formed by punching or pressing through the primary panel 14 or may be formed with machining techniques.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

As shown in FIG. 1, the trim component 12 is held or attached to the primary panel 14 by a fastener 20 and a doghouse 22. For illustrative purposes, the trim component 12 and the primary panel 14 are shown as relatively simple, flat panels; and are shown in cross section. However, these may have widely-varied shapes, thicknesses and sizes. Furthermore, there may be other components—such as structural braces, handles, knobs, cosmetic surfaces, controls, et cetera—attached to either or both of the trim component 12 and the primary panel 14. Note that, in many instances, manufacturing variability may cause the holes 16 be oblong or oval-shaped, as opposed to round.

Figure 2A:
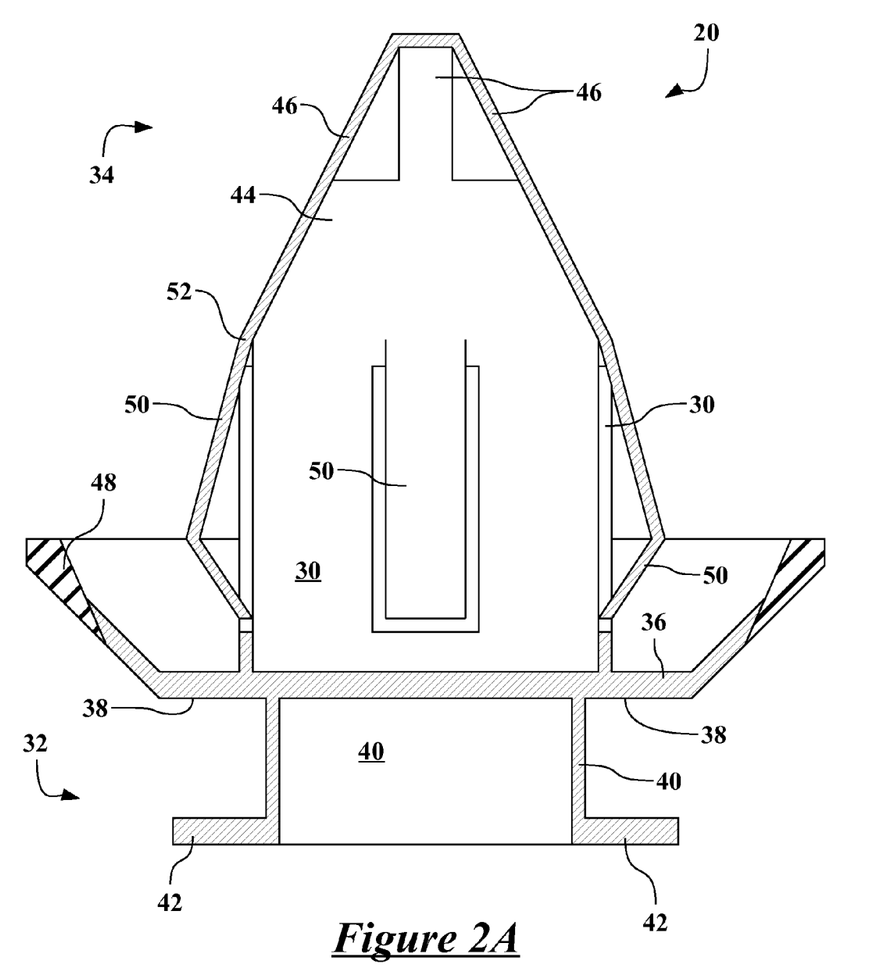
FIG. 2A is another cross-sectional view of the fastener shown in FIG. 1.
Figure 2B:
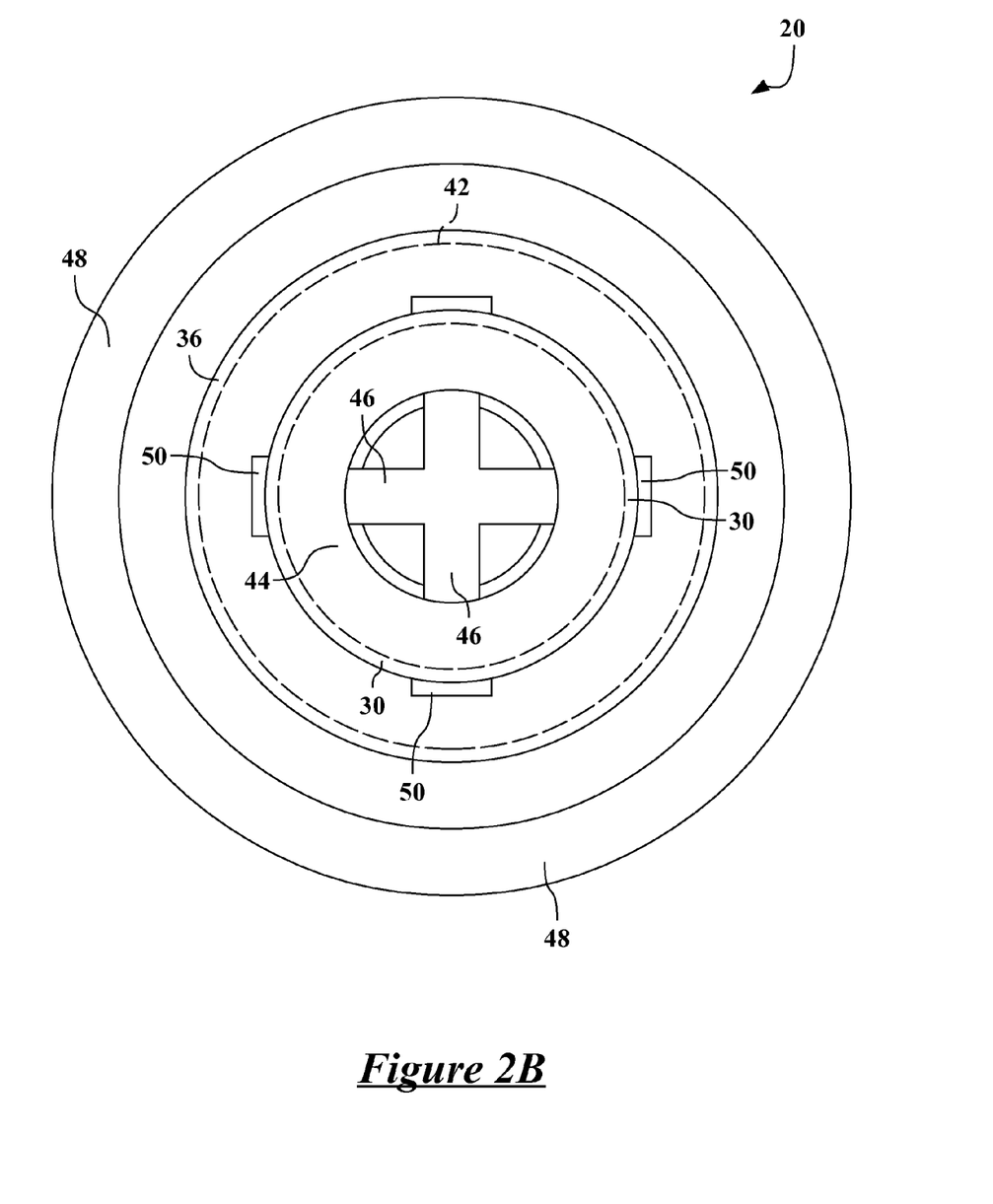
FIG. 2B is a top view of the fastener shown in FIG. 1.
Figure 3:
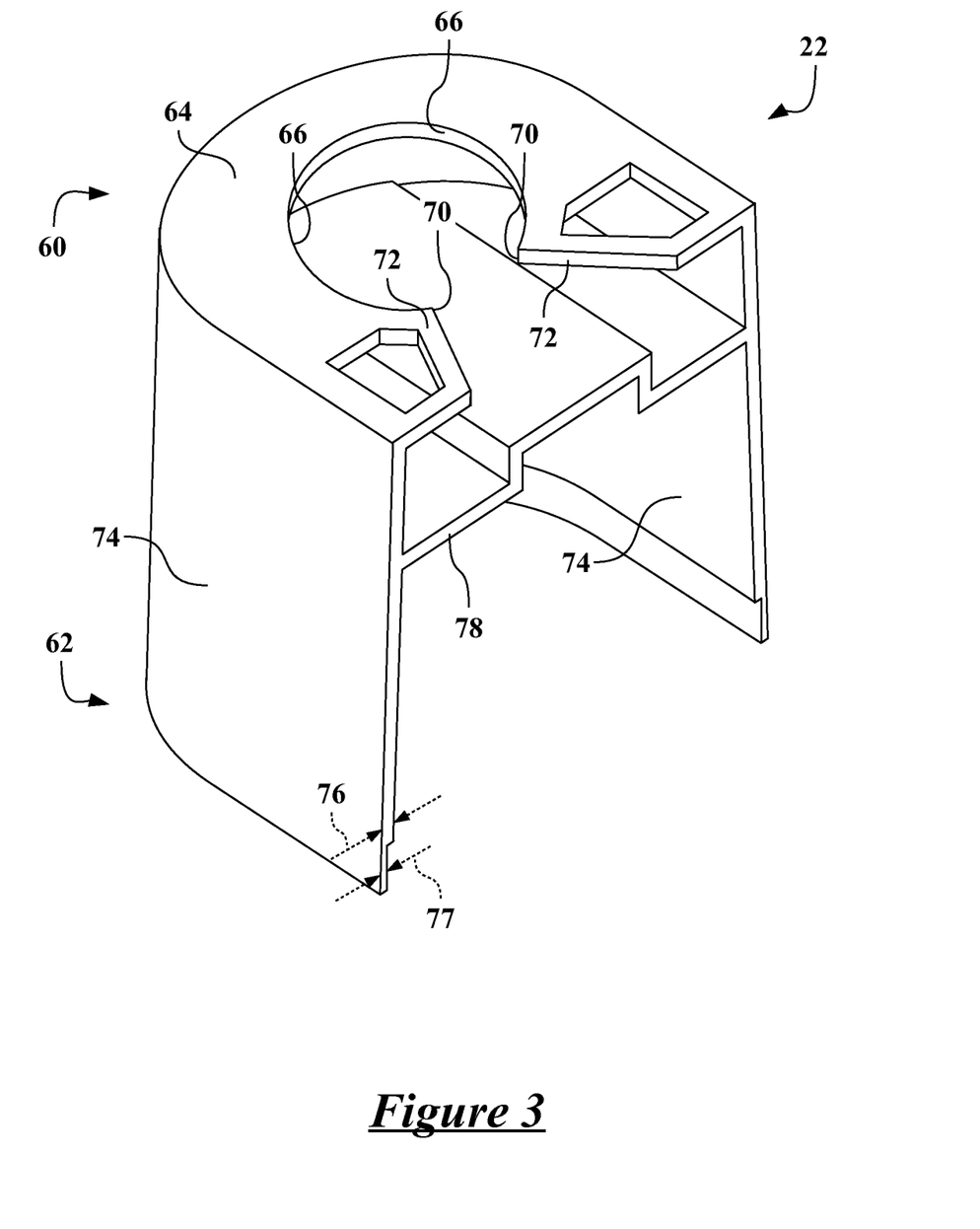
FIG. 3 is an isometric view of the doghouse shown in FIG. 1.

Referring now to FIG. 2A, FIG. 2B, and FIG. 3, and with continued reference to FIG. 1, there are shown more-detailed views of the fastener 20 and the doghouse 22. The fastener 20 joins the doghouse 22 to the primary panel 14 and is shown in more detail in FIGS. 2A and 2B. The doghouse 22 joins the fastener 20 to the trim component 12 and is shown in more detail in FIG. 3. Features and components shown in other figures may be incorporated and used with those shown in FIGS. 2A-2B and FIG. 3, and components may be mixed and matched between any of the configurations shown.

As shown in FIG. 2A, which is a cross-sectional view taken from substantially the same view point as that of FIG. 1, the fastener 20 has a core 30 substantially at its center. The core 30 is generally cylindrical, or barrel-shaped, and has a doghouse end 32 and a piercing end 34. For the fastener 20 shown, the core 30 is hollow, but may also be solid.

The doghouse end 32 of the fastener 20 includes a datum feature 36, which will cooperate with the doghouse 22 during assembly processes using the fastening system 10. In the embodiment shown, a planar datum surface 38 is located on the bottom of the datum feature 36.

A neck 40 extends from the datum feature 36 toward the doghouse end 32. The neck 40 will be held, surrounded, or grasped by the doghouse 22. A foot feature 42 is located on the doghouse end 32 at the opposite end of the neck 40 from the datum feature 36.

The piercing end 34 of the datum feature 36 includes a cone 44 extending from, or as the upper portion of, the core 30. The cone 44 is configured to pierce the rain paper 18 and also to center and guide the fastener 20 into the holes 16. In the configuration shown in FIGS. 1-2B, the cone 44 is not continuous and also includes four trusses 46.

A seal feature 48 extends upward from the datum feature 36 toward the piercing end 34. In the configuration shown in FIGS. 2A and 2B, the seal feature 48 is formed as a multi-shot injection. One shot, which also includes the datum feature 36, is formed from plastic, and another shot, which is formed from rubber, is injected over the plastic and the remainder of the fastener 20. Note that datum feature 36 also blocks passage of moisture through the hollow core 30.

However, the seal feature 48 may also be formed as continuous—one-piece and integral—portion of the datum feature 36 from the same material as the remainder of the fastener 20. Both types of seal feature 48 may be considered as integral seals because both are formed together and substantially continuously. Alternatively, the seal feature 48 may be a separate, added component, such as a rubber washer that is attached to and disposed between the datum feature 36 and the primary panel 14.

The seal feature 48 may be configured to flex or bend against the primary panel 14 when the fastener 20 is installed into the holes 16. The seal feature 48 is configured to create a watertight seal around the holes 16 in the primary panel 14, such that moisture is prevented (or at least limited) from passing from one side of the primary panel 14 to the other.

The fastener 20 includes at least three snap features 50 on the piercing end 34. The fastener 20 shown in FIGS. 1-2B includes four snap features 50. As shown in FIG. 2B, the snap features 50 are substantially symmetric about the core 30. If the fastener 20 had only three snap features 50, they would be oriented at approximately one hundred twenty degrees from each other.

Symmetry of the snap features 50 allows the fastener 20 to be inserted into, or removed from, the holes 16 with substantially uniform force even when the holes 16 are oblong or otherwise misshaped. Contrarily, asymmetric fasteners, such as those with only two attachment features, may have widely varying insertion force requirements depending upon how the fastener is oriented relative to the long axis and the short axis of oblong holes.

The snap features 50 are cantilevered outward from the core 30 toward the doghouse end 32, such that the snap features 50 are not attached to the core 30 on the portions nearest the doghouse end 32. The snap features 50 attach to the core 30 at attachment points 52, which are between the cone 44 and the doghouse end 32. Therefore, a portion of the beam or structure of the snap features 50 is projecting outwards beyond its support at the attachment points 52.

The snap features 50 shown have portions that are angled back toward the core 30. However, the snap feature 50 may be configured with only a single beam that flares outward but does not angle back toward the center of the fastener 20.

The piercing trusses 46 of the cone 44 are separate from the snap features 50, which are attached directly to the barrel-like core 30. Therefore, the trusses 46 (or the face of the cone 30, if solid) can break or fail without destroying the ability of the snap feature 50 to hold the fastener 20 into to the hole 16. Preventing the snap features 50 from breaking during misaligned insertions, such as those that initially miss the hole 16 and directly impact the primary panel 14, may improve assembly reliability.

As shown in FIGS. 1-2B, the width of the fastener 20 is approximately equal to the height of the fastener 20. In some configurations, such as that shown, the height-to-width ratio for the fastener 20 may be between ninety percent (90%) and one hundred and ten percent (110%). Other configurations may have different ratios, such as those with greater height relative to width.

Referring now to FIG. 3, and with continued reference to FIGS. 1-2B, there is shown an isometric view of the doghouse 22 shown in FIG. 1. FIG. 3 illustrates some of the features of the doghouse 22 that help attach the fastener 20 to the trim component 12.

The doghouse 22 includes a fastener end 60, which is configured to support the fastener 20. The opposing end of the doghouse 22 is a trim end 62, which is configured to attach to the trim component 12. The trim end 62 may be integrally attached (i.e., formed as one-piece with) to the trim component 12, or the trim end 62 may be fastened or adhered to the trim component 12.

The fastener end 60 of the doghouse 22 has a datum face 64, which is configured to interact with the datum surface 38 of the fastener 20. The datum face 64 provides a corresponding support surface for the datum surface 38, such that the fastener may be vertically aligned (up and down, as viewed in the figures) for insertion into the holes 16.

A cradle 66 is formed on the fastener end 60. The cradle 66 is configured to hold the fastener 20, such that the neck 40 of the fastener 20 sits within the cradle 66. The cradle 66 may be larger than the neck 40 of the fastener 20, such that a float or gap exists around the neck 40 when the fastener 20 is placed in the doghouse 22.

A collar 70 is formed in the fastener end 60 and is configured to allow the fastener 20 to access the cradle 66. The collar 70 may be slightly smaller than the neck 40 of the fastener, such that force is required to pass the neck 40 through the collar 70.

The doghouse 22 shown in FIG. 3 includes first and second leaf springs 72, which are disposed on opposing sides of the collar 70. The leaf springs 72 are configured to resist passage of the fastener 20 through the collar 70. Furthermore, the leaf springs 72 allow the collar 70 to be relatively small compared to the neck 40 of the fastener 20 because the leaf springs 72 introduce flexibility and reduce the chances of breaking the collar 70 during insertion of the fastener 20. Alternatively, some embodiments of the doghouse 22 may have only one leaf spring 72 on one side of the collar 70.

The doghouse 22 includes a wall 74 connecting the fastener end 60 to the trim end 62. The wall 74 may be divided into multiple walls 74 or may be continuous. In the embodiment shown in FIG. 3, the wall 74 has a first thickness 76 adjacent the fastener end 60 and a second thickness 77 adjacent the trim end 62. The second thickness 77 is smaller than the first thickness 76, such that the wall 74 is thinner at the trim end 62, which may improve manufacturability of the doghouse 22 and the trim component 12.

The doghouse 22 includes a floor piece 78 extending generally perpendicular to the wall 74 and substantially filling the gap between the wall 74. The floor piece 78 is configured to prevent the fastener 20 from moving toward the trim end 62.

When the fastener 20 is inserted into the doghouse 22, the datum feature 36 and the foot feature 42 of the fastener 20 cooperate with the datum face 64 of the fastener end 60 and the floor piece 78 to generally align the fastener 20 vertically. The neck 40 of the fastener 20 and the cradle 66 of the doghouse 22 cooperate to align the fastener 20 relative to the hole 16. The dimensions of the fastener 20 relative to the doghouse 22 will vary based upon the manufacturing variability of the materials used for the fastener 20 and the doghouse 22 and the manufacturing variability of the holes 16. If the holes 16 are more likely to be misshapen or misaligned, then the amount of float between the fastener 20 and the doghouse 22 may be increased.

Figure 4:
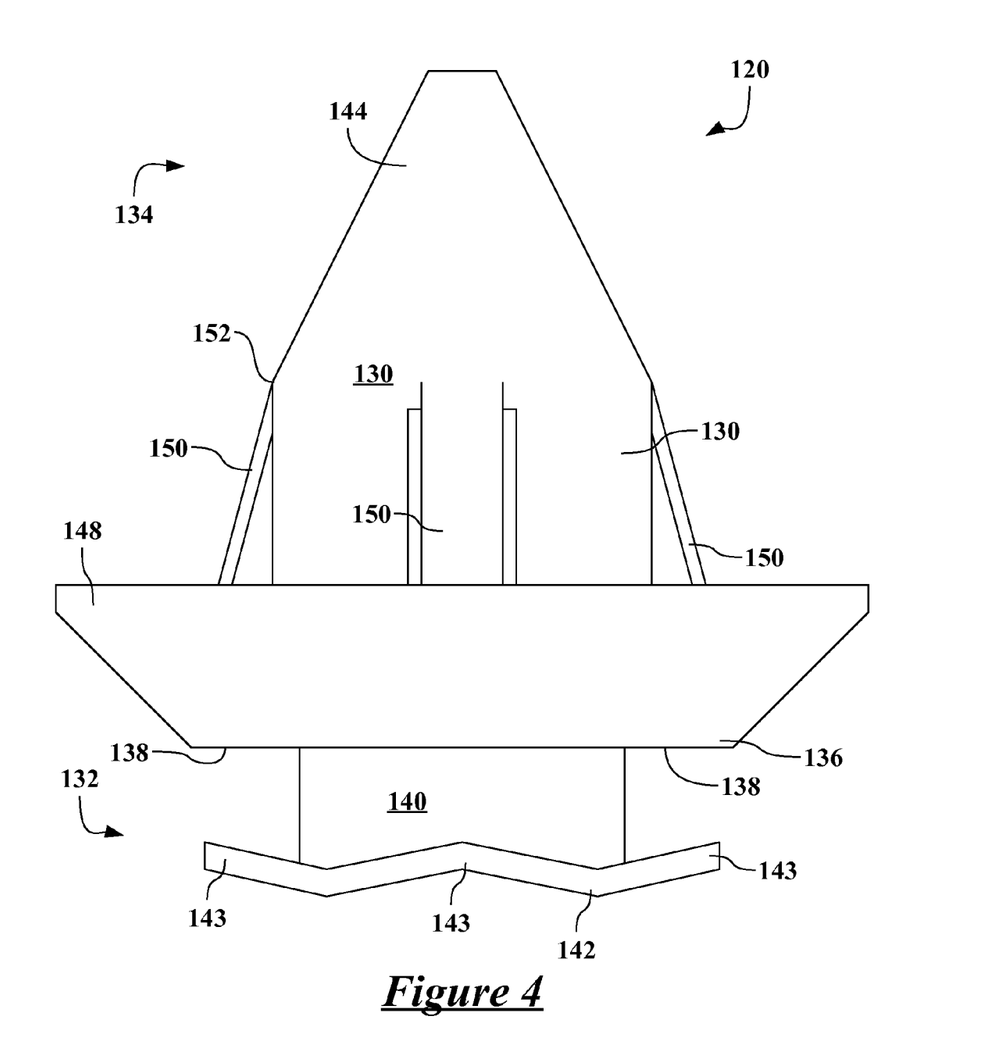
FIG. 4 is a schematic, side view of an alternative fastener, which may be used in fastening systems similar to that shown in FIG. 1.
Figure 5:
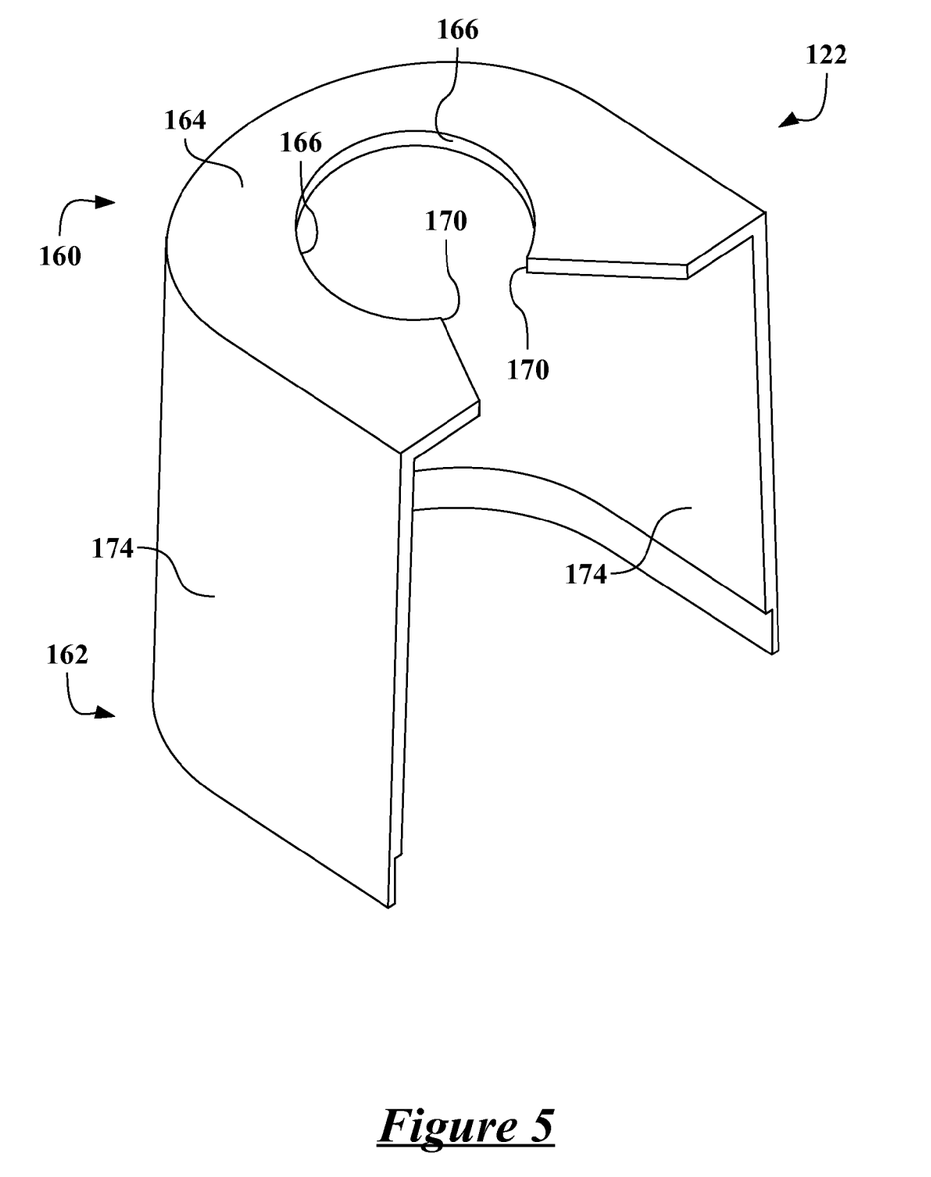
FIG. 5 is a schematic, isometric view of an alternative doghouse, which may be used in fastening systems similar to that shown in FIG. 1.

Referring now to FIG. 4 and to FIG. 5, and with continued reference to FIGS. 1-3, there are shown views of a fastener 120 and a doghouse 122, both of which may also be used with fastening systems similar to the fastening system 10 shown in FIG. 1 or other fastening systems. The fastener 120 may also be used with the doghouse 22. The fastener 120 may be used to join the doghouse 22 or the doghouse 122 to the primary panel 14. Features and components shown in other figures may be incorporated and used with those shown in FIG. 4 and FIG. 5, and components may be mixed and matched between any of the configurations shown.

As shown in FIG. 4, the fastener 120 has a core 130 substantially at its center. The core 130 is generally cylindrical and has a doghouse end 132 and a piercing end 134. For the fastener 120 shown, the core 130 may be hollow or may be solid.

The doghouse end 132 of the fastener 120 includes a datum feature 136, which will cooperate with the doghouse 122 during assembly processes using the fastening system 10. In the embodiment shown, a planar datum surface 138 is located on the bottom of the datum feature 136.

A neck 140 extends from the datum feature 136 toward the doghouse end 132. The neck 140 will be held, surrounded, or grasped by the doghouse 122. A foot feature is located on the doghouse end 132 at the opposite end of the neck 140 from the datum feature. Unlike the fastener 20, the foot feature of the fastener 120 is a wave washer 142, which has spring portions 143 extending toward the piercing end 134.

The wave washer 142 is formed as one-piece with the neck 140 and the remainder of the fastener 120. The spring portions 143 of the wave washer 142 allow the doghouse end 132 to apply its own retention force when mated with the doghouse 122. This may improve the retention of the fastener 120 to the doghouse 122 during intermediate steps or transportation before the fastener 120 is attached to the primary panel 14.

The piercing end 134 of the datum feature 136 includes a cone 144 extending from, or as the upper portion of, the core 130. The cone 144 is configured to pierce rain paper and also to center and guide the fastener 120 into the holes (such as the holes 16). Unlike the fastener 20, the cone 144 of the fastener 120 does not include any trusses, but is generally solid.

The fastener 120 has an integrated, one-piece, seal feature 148 formed from the same material as the datum feature 136. The seal feature 148 may be configured to be pressed against the primary panel 14, to prevent moisture from passing through the hole 16 adjacent to the fastener 120.

The fastener 120 includes at least three snap features 150 on the piercing end 134. The fastener 120 shown in FIG. 4 includes four snap features 150. The snap features 150 may be substantially symmetric about the core 130.

The snap features 150 are cantilevered outward from the core 130 toward the doghouse end 132, such that the snap features 150 are not attached to the core 130 on the portions nearest the doghouse end 132. The snap features 150 attach to the core 130 at attachment points 152, which are between the cone 144 and the doghouse end 132. Therefore, a portion of the beam or structure of the snap features 150 is projecting outwards beyond its support at the attachment points 152.

As shown in FIG. 5, the doghouse 122 includes a fastener end 160, which is configured to support the fastener 120. The opposing end of the doghouse 122 is a trim end 162, which is configured to attach to the trim component 12. The trim end 162 may be integrally attached (i.e., formed as one-piece with) to the trim component 12, or the trim end 162 may be fastened or adhered to the trim component 12.

The fastener end 160 of the doghouse 122 has a datum face 164, which is configured to interact with the datum surface 138 of the fastener 120. The datum face 164 provides a corresponding support surface for the datum surface 138, such that the fastener may be vertically aligned (up and down, as viewed in the figures) for insertion into the holes 16.

A cradle 166 is formed on the fastener end 160. The cradle 166 is configured to hold the fastener 120, such that the neck 140 of the fastener 120 sits within the cradle 166. The cradle 166 may be larger than the neck 140 of the fastener 120, such that a float or gap exists around the neck 140 when the fastener 20 is placed in the doghouse 122.

A collar 170 is formed in the fastener end 160 and is configured to allow the fastener 120 to access the cradle 166. The collar 170 may be slightly smaller than the neck 140 of the fastener, such that force is required to pass the neck 140 through the collar 170.

Unlike the doghouse 22, the doghouse 122 does not include leaf springs because the doghouse 122 may be used in conjunction with the fastener 120. The wave washer 142 of the fastener 120 may provide sufficient retention to the doghouse 122 such that the collar 170 may be wider relative to the neck 140 of the fastener 120 and the leaf springs may not be needed.

The doghouse 122 includes a wall 174 connecting the fastener end 160 to the trim end 162. The wall 174 may be divided into multiple walls 174 or may be continuous.

Unlike the doghouse 22, the doghouse 122 does not include a floor piece. The floor piece may not be needed on the doghouse 122 if it is mated to the fastener 120, because the wave washer 142 may provide sufficient vertical holding and alignment to the fastener end 160 without the floor piece.

When the fastener 120 is inserted into the doghouse 122, the datum feature 136 and the wave washer 142 of the fastener 120 cooperate with the datum face 164 of the fastener end 160 to generally align the fastener 120 vertically. The wave washer 142 also provides support to keep the neck 140 of the fastener 120 within the cradle 166 of the doghouse 122, even if the collar 170 is not tightly restricting passage of the neck 140. Note, however, that the fastener 120 is not required to be used with the doghouse 122, but may be used in other configurations.

The dimensions of the fastener 120 relative to the doghouse 122 will vary based upon the manufacturing variability of the materials used for the fastener 120 and the doghouse 122 and the manufacturing variability of the holes 16. If the holes 16 are more likely to be misshapen or misaligned, then the amount of float between the fastener 120 and the doghouse 122—particularly between the neck 140 and the cradle 166—may be increased.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A fastening system configured to engage a trim component to a primary panel having at least one hole, comprising:
    a fastener configured to attach to the at least one hole of the
        primary panel, and having:
        a core having a doghouse end and a piercing end,
        a datum feature, a neck extending from the datum feature toward the doghouse end, a foot feature on the doghouse end, wherein the foot feature is a wave washer having spring portions extending toward the piercing end, a cone on the piercing end, wherein the cone is configured to pierce rain paper, and at least three snap features attached to the core between the cone and the doghouse end, such that the at least three snap features are symmetric about the core, wherein each of the at least three snap features is cantilevered from the core toward the doghouse end such that the at least three snap features are attached toward the piercing end and are not attached toward the doghouse end; and a doghouse configured to join the trim component to the fastener, and having:

a fastener end configured to support the fastener, a trim end configured to attach to the trim panel, a cradle formed on the fastener end and configured to hold the fastener, and a collar configured to allow the fastener access to the cradle.

2. The fastening system of claim 1, further comprising:

a seal feature extending from the datum feature toward the piercing end, wherein the seal feature is formed integrally with the datum feature.

3. The fastening system of claim 2, wherein the cradle of the doghouse is configured to hold the neck of the fastener, and wherein the cradle is larger than the neck of the fastener.

4. A fastener, comprising:

a core having a doghouse end and a piercing end;

a datum feature;

a neck extending from the datum feature toward the doghouse end;

a foot feature on the doghouse end, wherein the foot feature is a wave washer having spring portions extending toward the piercing end;

a cone on the piercing end, wherein the cone is configured to pierce rain paper; and at least three snap features, such that the at least three snap features are symmetric about the core, wherein each snap feature is cantilevered from the core toward the doghouse end such that the snap feature is attached toward the piercing end and is not attached toward the doghouse end.

5. The fastener of claim 4, further comprising a seal feature extending from the datum feature toward the piercing end.

6. The fastener of claim 5, wherein the seal feature is formed integrally with the datum feature.

7. The fastener of claim 6, wherein the datum feature has a planar datum surface.

8. The fastener of claim 7, wherein a width of the fastener is approximately equal to a height of the fastener.

9. The fastener of claim 8, wherein the cone includes at least four trusses.

10. The fastener of claim 9, further comprising at least four snap features.

11. The fastener of claim 4, wherein the at least three snap features attach to the core between the cone and the doghouse end.

12. The fastener of claim 11, wherein the core is a hollow cylinder.

13. A fastener, comprising:

a core having a doghouse end and a piercing end;

a datum feature;

a neck extending from the datum feature toward the doghouse end;

a foot feature on the doghouse end, wherein the foot feature is a wave washer having spring portions extending toward the piercing end;

a cone on the piercing end, wherein the cone is configured to pierce rain paper; and at least three snap features, such that the at least three snap features are symmetric about the core.

14. The fastener of claim 13, wherein the cone includes at least four trusses.

15. The fastener of claim 14, wherein each snap feature is cantilevered from the core toward the doghouse end.

16. The fastener of claim 15, wherein the at least three snap features attach to the core between the cone and the doghouse end.

17. The fastener of claim 16, further comprising:

a seal feature extending from the datum feature toward the piercing end, wherein the seal feature is formed integrally with the datum feature.

* * * * *